April 13, 1965

J. VON RÖTEL

3,178,027

CONTINUOUSLY OPERATING FILTER CENTRIFUGE

Filed Jan. 31, 1961

INVENTOR
JULIUS VON ROTEL,

BY Baier, Stephens & Huettig

ATTORNEYS

April 13, 1965  J. VON RÖTEL  3,178,027
CONTINUOUSLY OPERATING FILTER CENTRIFUGE
Filed Jan. 31, 1961  4 Sheets-Sheet 2
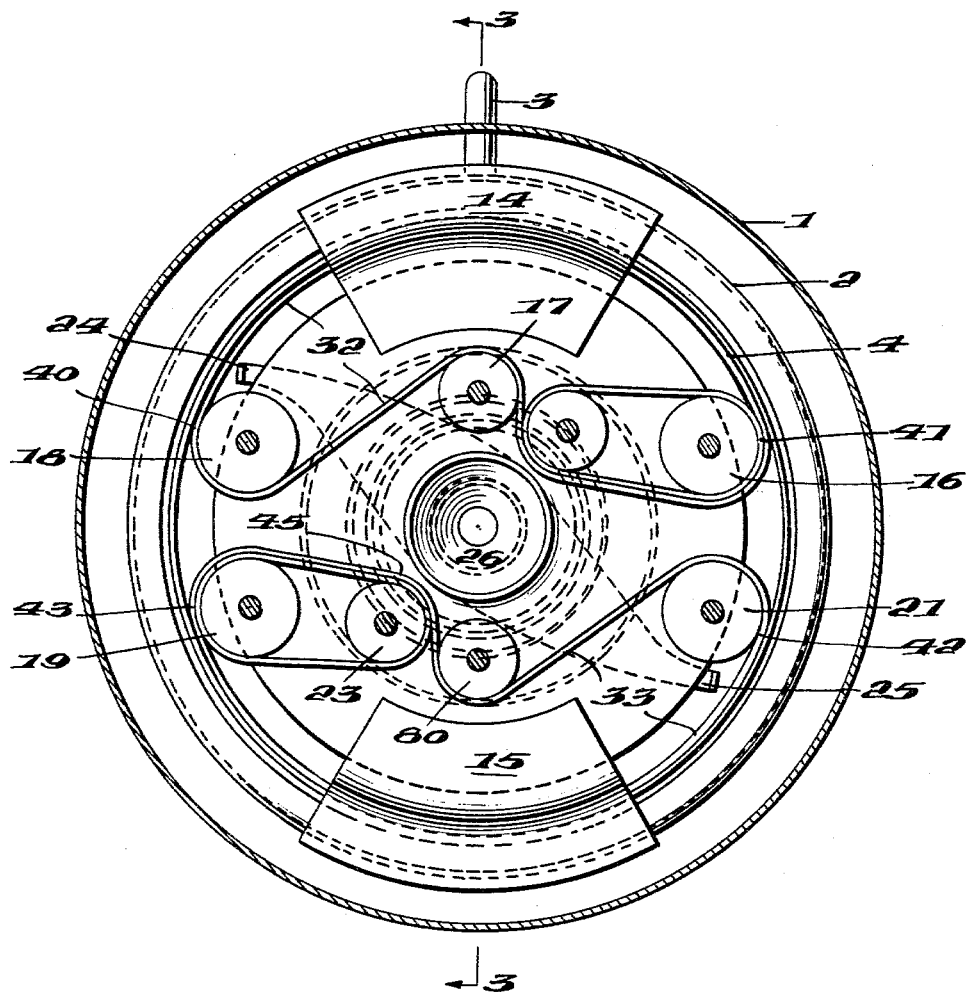
INVENTOR
JULIUS VON ROTEL,
BY
ATTORNEYS

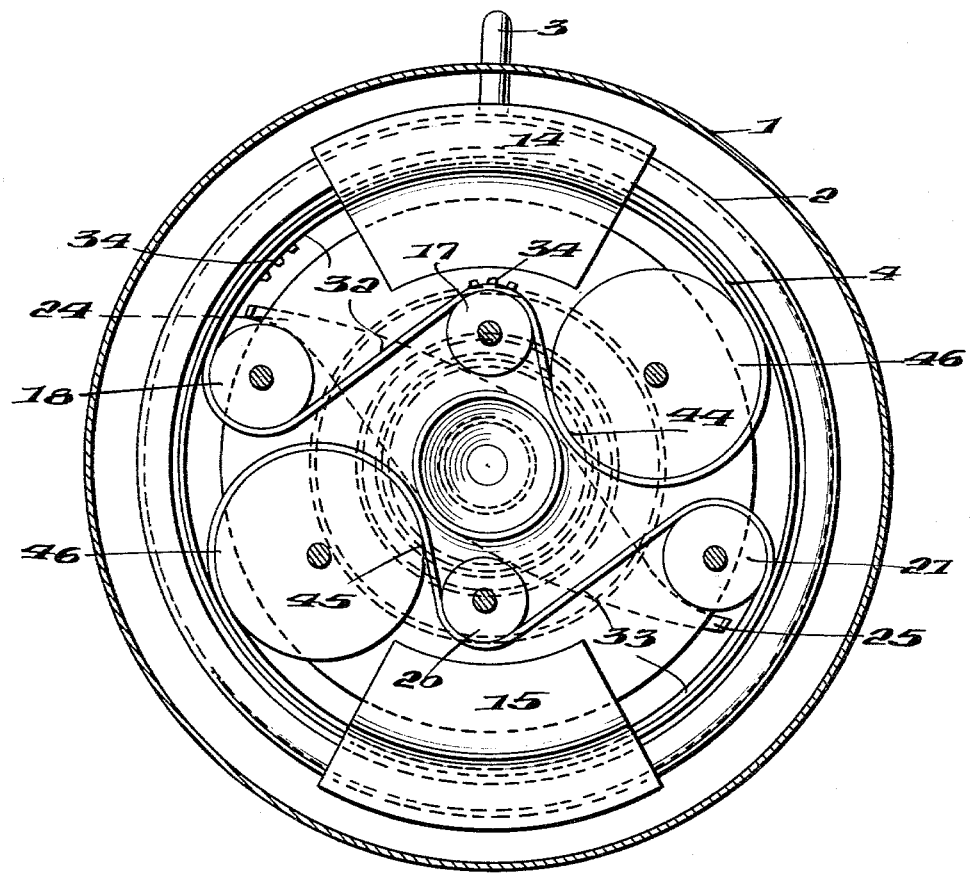

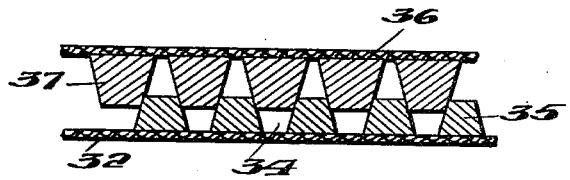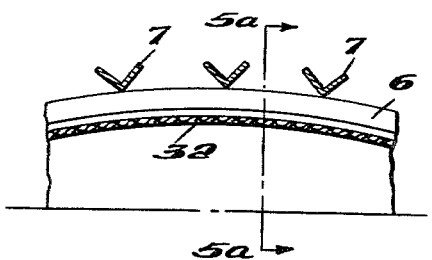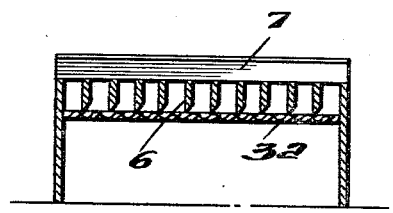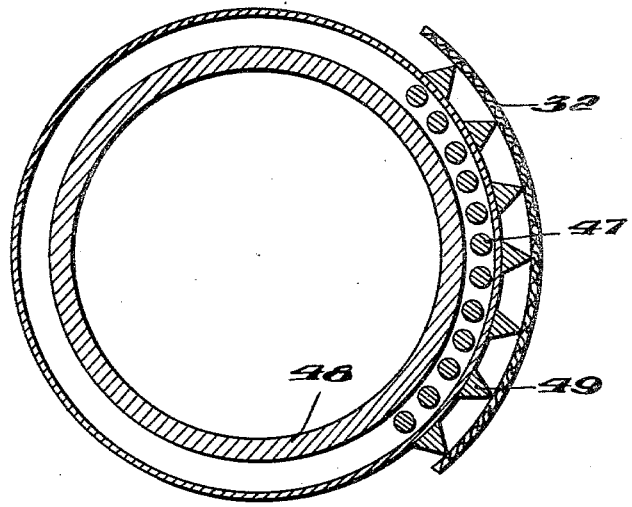

United States Patent Office 3,178,027
Patented Apr. 13, 1965

3,178,027
CONTINUOUSLY OPERATING FILTER
CENTRIFUGE
Julius von Rötel, Kirschbaumweg 118,
Dortmund, Germany
Filed Jan. 31, 1961, Ser. No. 86,230
10 Claims. (Cl. 210—370)

Continuously operating filter centrifuges, also named band-pass centrifuges, operate in such a way that a continuous filter belt revolves inside a holding drum and is directed in such a way that the belt side which is inside is turned to the outside over guide pulleys. With the band-bass centrifuges known so far, this reversal of the filter belt is carried out by pulleys or discs which are driven around their axes. The movement of the belt results from friction upon the pulleys or discs. This means that the movement of the belt is not absolutely positive. Since the belt is always moist, it can happen that the friction between the belt and the pulleys is not great enough to carry the belt along. In this case, the pulleys grind into the belt with the result that the operation is interrupted and the belt is destroyed prematurely.

The invention is based upon the idea of so directing the continuous filter belt in such a band-pass centrifuge in such a way that a safe movement of the belt is guaranteed in any case. According to the invention this problem has been solved by directing the continuous filter belt over a system of loose pulleys inside the holding drum, the pulleys being arranged on a frame which rotates at a higher speed than the holding drum. The loose return pulleys are so arranged that one pulley causes releasing of the filter belt from its engagement with the drum to a certain degree, and the opposite pulley draws the belt along by the amount of the length released and lays it up on the holding drum again. Because of this relative speed and the position of the loose pulleys with respect to the inner wall of the holding drum, the filter belt which is pressed against the drum by centrifugal force winds off at one end from the drum and moves against it at the other end. Between the two return pulleys a further guide pulley is arranged within the region of a chute in order to collect the separated material, which chute faces a part of the filter belt between the two pulleys where the interior surface of the belt is turned towards the outside. Thereby, when the belt is revolving round this guide pulley the centrifugal force causes the material sticking on the filter belt to be centrifuged into the chute by which it can be led to the outside.

In order to keep the rotating parts in balance two systems are arranged symmetrically inside the drum-like housing, each of which comprise a continuous filter belt and the steering pulley connected with it, each being within a hemi-cylinder.

The drive of the holding drum and holding frame for the steering pulleys which revolve at different speeds is suitably carried out with a so-called "Cyclo" gear which makes it possible to give the rotating parts different rotating speeds with one common drive.

Since the filter belt which is adjacent to the inner area of the holding drum due to centrifugal force is turned after running off from the first return pulley so that the area on the inside of the belt loaded with solids is directed to the outside, but since the separation of the solids should take place at a certain location only, within the region of a chute, according to the invention a device has been provided in which the turned over filter belt is pressed upon by another belt until it reaches the chute, so that up to that point separation is prevented. This arrangement can consist of a continuous belt which is also directed loose pulleys, the first return pulley of the pulley system serving as the guide pulley for this additional belt. Another possibility is that the return pulley with which the filter belt loaded with solids first comes in contact as it leaves contact with the inner wall of the drum has such a diameter that the inside of that part of the filter belt running over it is kept in contact with this pulley up to the region of the chute. Since in this case this pulley would also be subject to centrifugal force due to the revolving of the holding frame and would have a considerable weight because of its relatively large diameter, a really considerable bearing pressure would result on the pulley which carries the bearings. This disadvantage can be overcome by the invention by arranging firmly on the sub-base of the pulley frame a hollow cylinder with the necessary diameter. On the outer surface of this cylinder a kind of needle roller bearing is arranged and round this a thin jacket, so that the filter belt runs on this. This hollow cylinder can then be constructed with a low weight so that only the bearing pressure resulting from this low weight would affect the bearing.

In connection with the arrangement and operation described it is practical to give the filter belts a special form by providing pockets or chambers which serve for collecting the product to be handled. According to this construction also the arrangement mentioned for preventing too early a separation of the solids from the filter belt can be made in this way. The invention is shown in detail in the drawings, in which:

FIG. 1 shows schematically a vertical cross-section through the filter centrifuge;

FIG. 2 shows schematically in top plan view the arrangement of the guides for the filter belts;

FIG. 3 shows a further modification of the guide pulleys;

FIG. 4 shows a detail of a filter belt and a cover belt with collecting chambers;

FIG. 5 shows in horizontal section an arrangement of the drum wall for the filter belt;

FIG. 5a is a vertical cross-section on the line 5a, 5a of FIG. 5; and

FIG. 6 shows a further modification of the return pulley and cover pulley.

In the housing 1 in which the dried solids are separated an inner housing 2 is firmly arranged which collects the liquid to be discharged through tube 3. Mounted to rotate in the housing about a vertical axis is the holding drum 4 on the inner wall of which parts of the filter belts 32 and 33 are held by centrifugal force. Drum 4 is connected by a conical portion 26 with the hollow shaft 29 of the Cyclo gear 10. The wall of drum 4 may consist of several rings 6 (FIG. 5) which are connected at uniform spacings with the vertical angle irons 7 in order to guarantee a good liquid outflow. The belt transport arrangement 9 consists of a lower disc 11, a thick walled vertical tube 12, an upper disc 13, the two chutes 14 and 15 which also revolve with the discs, the belt return pulleys 16, 17, 18, 19, 20 and 21 and the auxiliary return pulleys 22 and 23. All these pulleys are loosely arranged.

The channels 24 and 25 for feeding the material to be filtered to the filter belts are constructed similar to the wings of a centrifugal pump (channel wheel) and connected firmly with the belt transport arrangement 9. This belt transport arrangement is connected with the solid shaft 27 of the Cyclo gear 10 by the cone-like tube 26, to which the channels 24, 25 are connected. This gear controls the relative angular speed of the belt transport arrangement 9 with respect to the holding drum 4 and delivers the necessarily large torque moment due to its high transmission ratio in order to start the filter belt moving. Continuous filter belts 32 and 33 each extend round the pulleys 16, 17, 18, 19, 20, 21 in such a way as to move around them during rotation of the belt transport device.

The Cyclo gear 10 is driven by the V belt wheel 30. The eccentric shaft 31 is held stationary. By this arrangement, relative movement of the solid shaft 27 and of the belt transport system 9 with respect to the hollow shaft 29 and the holding drum 4 will be effected. Since the portions of the filter belts which engage the inside of the drum which is moving at a different speed will be pressed against the drum wall by centrifugal force and held thereagainst by friction, the belts will travel around the pulleys as the transport arrangement revolves. The relative movement of the belt transport arrangement 9 with respect to holding drum 4 will be smaller the greater is the transmission ratio of the Cyclo gear 10. The actual separation elements are the parts of the two filter belts 32 and 33 which at any time engage the wall.

The belt 32 is wound around pulleys 16, 17 and 18 and is held against the inside of the holding drum 4 by centrifugal force. In order to prevent unbalance, the belt 33 lies in symmetrical position on the opposite half of the holding drum 4 and is wound around pulleys 19, 20 and 21.

The filter belts can have chambers 34 on their inner side (FIG. 4) which are constructed by attaching wedge-shaped strips 35 of plastic or rubber on the filter belt transverse to the direction of movement of the belt. These chambers 34 will be filled more or less by channels 24 and 25 one after the other with the liquid to be filtered when the filter belt constantly passes the ends of the channels. This prevents newly entering liquid from being distributed over the whole effective filter belt and in this way moistening again the already dry separated solids. The chambers 34 will be closed by a cover belt 36 when the belt is running from pulley 16 to pulley 17 with the dried solids in order to prevent centrifuging. The cover belt 36 can also have elastic, wedge-shaped transverse ribs 37 (FIG. 4) which fit into the filter chambers 34.

By the drive of the Cyclo gear 10 both the holding drum 4 and the belt transport arrangement 9 will be brought to rotation at different speeds.

The filter belts 32 and 33 are pressed firmly on the inside of the holding drum 4 by centrifugal force. If the transport device turns faster than the drum (counter-clockwise in FIG. 2), the end of the filter belt section at pulleys 16, 19 will be released from engagement with the drum wall while pulleys 18, 21 will lay fresh sections of belt against the wall, drawing there from pulleys 16, 19. Since the effective part of the filter belt is pressed against the inner wall 5 of the holding drum 4 from a point 40 to point 41 or from point 42 to point 43 under influence of centrifugal force, the pulley 18 or 21 can only pull the filter belt from pulley 16 or 19 past the return pulley 17 or 20. The filter belt passes along on the inner side of the holding drum 4 in the direction of rotation while the same length of filter belt which pulley 16 or 19 releases from pulleys 18 or 21 is laid on the inside of the holding drum 4. The product to be filtered flows out of tube 38 into tube 26 and from this point on to the interior of filter belts 32 and 33 by means of the channels 24 and 25. The filter belts pass constantly with always new and empty chambers by the ends of the channels 24 and 25, whereby chambers 34 are filled with the material. The solid parts of the product fed will remain in chambers 34 until points 41, 43 are reached. During this time the product is subject to centrifugal force, the liquid flowing into the inner housing 2 through the filter cloth. Then the filter belt runs round pulley 16, chambers 34 being closed by the wedge-shaped ledges 37 of the cover belt 36.

Cover belt 36 runs round return pulleys 16 and 22 or 19 and 23. On the way from pulley 16 to pulley 22 or from pulley 19 to pulley 23, chambers 34 remained closed. The dried solids which are in these chambers tend to leave these chambers under the influence of centrifugal force. Since these chambers are closed by the wedge-shaped ribs 37 of the cover belt 36, the solids cannot leave chambers 34 until these open after the belt leaves pulley 22 or 23. Under the influence of centrifugal force, the solids now pass from chambers 34 into the chutes 14 and 15 which are also rotating. Because of the centrifugal force, the solids which have dropped into the chutes pass along in these and leave the rotating system at 50 or 51 and are thrown against the stationary inner wall of the outer housing 1. From here they drop out of the machine under gravity.

With the construction according to FIG. 3 the function which is carried out by return pulleys 16 and 22 or 19 and 23 with cover belts 36 according to the construction of FIGS. 1 and 2 is accomplished by the return pulley 46. The return pulley 46 consists of a hollow cylinder which is arranged on disc 11 and which has on its periphery needles which form a needle roller bearing. The needles 47 are covered by a thin jacket 48 on which the filter belt 32 or 33 engages from point 41 to point 44 or 43 to 45, so that chambers 34 of the filter belt are kept closed.

When using a smooth filter belt with wedge-shaped transverse ribs, the covering device can be provided with wedge-shaped ribs which penetrate into the solids layer on the filter belt up to the filter belt surface. Thereby chambers are formed which remain closed until the filter belt is released for discharge of the product. FIG. 6 shows such a construction. Here on the outer jacket 48 of the return pulley 46 wedge-shaped ribs 49 are provided. These form closed chambers on the return pulley 46 which spins round the filter belt 32 which is covered with a solids layer free from moisture and retain the solids until the filter belt at 44 or 45 is free for separating the solids.

Instead of the construction shown in FIG. 4, the ribs 37 of the cover belt can be constructed as the ribs 49 (FIG. 6) when using a smooth filter band.

I claim:
1. A continuously operating centrifugal filter comprising a perforated drum mounted for rotation about an axis, a carrier mounted within the drum for rotation about the same axis, means to produce relative rotary movement between the drum and carrier, at least one endless filter belt, and means carried by the carrier movably mounting said endless belt thereon for free movement in a horizontal path, the belt in a substantial part of said path engaging the inside wall of the drum under centrifugal force, means to feed a liquid to be filtered to the interior of the belt, and means to remove solids from the interior of the belt.

2. A continuously operating centrifugal filter comprising a perforated drum mounted for rotation about an axis, a carrier mounted within the drum for rotation about the same axis, means to rotate the drum and carrier at different speeds, pulley means carried by said carrier including at least two pulleys mounted on the carrier for free rotation about axes parallel to said first axis, and an endless filter belt guided in a path around said pulley means and having a length sufficiently greater than the circuit of the pulley means to allow the belt in a part of the path between the two pulleys to be pressed against the inside wall of the drum by centrifugal force, means to feed a liquid to be filtered to the interior of the belt, and means to remove solids from the interior of the belt.

3. A device as claimed in claim 2 in which said pulley means lie within a hemicyclinder, and said path includes a section in which the interior surface of the belt faces outwardly, said removal means receiving solids discharged from the belt in such section of its path.

4. A device as claimed in claim 3 including means engageable against the interior surface of the belt, in the portion of its path between the last point of contact with the inside wall of the drum and a point diametrically opposite the removal means to prevent the escape of solids from the belt.

5. In a device as claimed in claim 4, said escape preventing means comprising a second belt and means guiding said second belt for movement in engagement with the interior surface of the filter belt in such portion of its path.

6. In a device as claimed in claim 4, said escape-preventing means having ribs thereon transverse to and engageable with the interior surface of the filter belt.

7. In a device as claimed in claim 2, said two pulleys having their peripheries closely adjacent the inside wall of the drum, said pulley means lying within a hemicylinder, and said path including a section in which the interior surface of the belt faces outwardly, said removal means receiving solids discharged from the belt in such section of its path, the pulley onto which the belt passes off from the inside wall of the drum having a diameter at least equal to the distance from its axis of rotation to a radius through one end of said section, whereby to prevent the escape of solids from the interior surface of the belt, in the portion of its path between the last point of contact with the inside wall of the drum and a point diametrically opposite the removal means.

8. In a device as claimed in claim 7, said last pulley comprising a first hollow cylinder mounted on the carrier, a second slightly larger cylinder on the outside of the first cylinder, and needle bearings between the cylinders, the belt engaging the second cylinder.

9. In a device as claimed in claim 1, said belt having a plurality of transverse ribs on its interior surface forming chambers for holding the solids.

10. A device as claimed in claim 8 including means engageable against the interior surface of the belt, in the portion of its path between the last point of contact with the inside wall of the drum and a point diametrically opposite the removal means, to prevent the escape of solids from the belt, said escape-preventing means comprising a second belt and means guiding said second belt for movement in engagement with the interior surface of the filter belt in such portion of its path, said second belt having transverse ribs engageable in the grooves between the ribs of the filter belt.

References Cited by the Examiner

UNITED STATES PATENTS

| | | | |
|---|---|---|---|
| 1,280,469 | 10/18 | Hiller | 210—370 |
| 1,411,582 | 4/22 | Parker et al. | 210—370 |
| 2,037,840 | 4/36 | Weston | 210—370 X |

FOREIGN PATENTS 561,223    8/58    Canada.

GEORGE D. MITCHELL, *Primary Examiner.*

ROBERT F. BURNETT, HERBERT L. MARTIN,
*Examiners.*